(12) United States Patent
Vander Sluis

(10) Patent No.: US 10,155,463 B2
(45) Date of Patent: Dec. 18, 2018

(54) ARMREST APPARATUSES INCLUDING TRANSLATING DOCKING STATION ARRANGEMENTS FOR MOTOR VEHICLES

(71) Applicant: Faurecia Interior Systems, Inc., Auburn Hills, MI (US)

(72) Inventor: Daniel Vander Sluis, Auburn Hills, MI (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 314 days.

(21) Appl. No.: 14/945,605

(22) Filed: Nov. 19, 2015

(65) Prior Publication Data

US 2017/0144572 A1 May 25, 2017

(51) Int. Cl.
*B60N 2/75* (2018.01)
*B60R 11/00* (2006.01)

(52) U.S. Cl.
CPC .............. *B60N 2/773* (2018.02); *B60N 2/767* (2018.02); *B60N 2/793* (2018.02); *B60R 11/00* (2013.01); *B60R 2011/0014* (2013.01)

(58) Field of Classification Search
CPC .. B60N 2/4633; B60N 2/4646; B60N 2/4653; B60N 2/4686; B60N 2/468
USPC .......................... 297/188.16, 188.15, 188.17
See application file for complete search history.

(56) References Cited

U.S. PATENT DOCUMENTS

| | | | | |
|---|---|---|---|---|
| 5,853,220 A * | 12/1998 | Gulich | ................. | B60N 2/4686 297/188.16 |
| 6,139,096 A * | 10/2000 | Anderson | .............. | B60N 2/462 297/144 |
| 6,520,576 B1 * | 2/2003 | Burns | .................. | B60N 2/4606 248/311.2 |
| 6,890,012 B2 * | 5/2005 | Maierholzner | ........... | B60R 7/04 296/1.07 |
| 7,413,229 B2 * | 8/2008 | Kukucka | .............. | B60N 2/4646 296/1.09 |
| 7,416,235 B2 * | 8/2008 | Rajappa | .................... | B60R 7/04 296/24.34 |
| 8,528,956 B1 * | 9/2013 | Winiger | .................... | B60R 7/04 296/24.34 |

(Continued)

FOREIGN PATENT DOCUMENTS

| | | |
|---|---|---|
| CN | 204387606 U | 6/2015 |
| CN | 204392371 U | 6/2015 |

(Continued)

OTHER PUBLICATIONS

European Patent Office, Extended European Search Report for Application No. 16199288.8-1503 dated Apr. 11, 2017.

*Primary Examiner* — Timothy J Brindley
(74) *Attorney, Agent, or Firm* — LKGlobal | Lorenz & Kopf, LLP

(57) ABSTRACT

Armrest apparatuses for motor vehicles are provided. In one example, an armrest apparatus comprises an armrest main base. A translating docking station arrangement for holding a nomadic device is operatively coupled to the armrest main base to move relative to the armrest main base between a retracted position and a deployed position. The translating docking station arrangement in the retracted position substantially covers the armrest main base. The translating docking station arrangement in the deployed position is shifted laterally relative to the retracted position.

13 Claims, 11 Drawing Sheets

(56) References Cited

U.S. PATENT DOCUMENTS

| | | | |
|---|---|---|---|
| D704,195 S | 5/2014 | Marquette | |
| 8,727,413 B2 | 5/2014 | Seiller et al. | |
| 8,807,621 B2 | 8/2014 | Stephan | |
| 8,910,990 B1 | 12/2014 | Oldani et al. | |
| 9,758,248 B2 * | 9/2017 | Procter | B64D 11/00152 |
| 2001/0020620 A1 * | 9/2001 | Katagiri | B60R 7/04 220/345.2 |
| 2002/0163215 A1 * | 11/2002 | Emerling | B60N 2/4686 296/24.34 |
| 2003/0155786 A1 * | 8/2003 | Kim | B60R 7/04 296/24.34 |
| 2003/0234550 A1 * | 12/2003 | Brooks | B60N 2/4646 296/24.46 |
| 2004/0080173 A1 * | 4/2004 | Niwa | B60N 2/4646 296/24.34 |
| 2005/0082858 A1 * | 4/2005 | Neumann | B60N 2/468 296/1.09 |
| 2005/0231008 A1 * | 10/2005 | Jaaska, Sr. | B60N 2/4613 297/188.2 |
| 2006/0108816 A1 * | 5/2006 | Radu | B60N 2/4606 296/24.34 |
| 2007/0063553 A1 * | 3/2007 | Lilov | B60N 2/4646 297/188.17 |
| 2007/0069544 A1 * | 3/2007 | Sturt | B60N 2/4686 296/37.8 |
| 2007/0205642 A1 * | 9/2007 | Bejin | B60N 2/4606 297/188.14 |
| 2009/0072565 A1 * | 3/2009 | Mayne, Jr. | B60N 2/4686 296/24.34 |
| 2009/0256376 A1 * | 10/2009 | Schneider | B60N 2/4646 296/24.34 |
| 2010/0050380 A1 * | 3/2010 | Fujiwara | B60N 2/4686 16/242 |
| 2010/0314896 A1 * | 12/2010 | Skibinski | B60N 2/4686 296/24.34 |
| 2014/0284957 A1 * | 9/2014 | Duenas | B60N 2/4686 296/37.9 |
| 2015/0115641 A1 * | 4/2015 | Inoue | B60N 2/4626 296/37.8 |
| 2015/0184692 A1 * | 7/2015 | Bozio | B60N 2/4646 296/37.1 |
| 2015/0258923 A1 * | 9/2015 | Skapof | B60N 2/4606 296/24.34 |
| 2016/0297335 A1 * | 10/2016 | Lee | B60N 2/4646 |
| 2017/0015225 A1 * | 1/2017 | Shin | B60N 2/4686 |
| 2017/0057387 A1 * | 3/2017 | Jang | B60N 2/4686 |
| 2017/0267183 A1 * | 9/2017 | Catlin | B60R 7/04 |

FOREIGN PATENT DOCUMENTS

| | | |
|---|---|---|
| DE | 4340516 A1 | 6/1995 |
| DE | 102007041319 A1 | 3/2009 |
| DE | 102010025563 A1 | 12/2011 |
| DE | 102012005256 A1 | 9/2013 |
| WO | 2015057851 A1 | 4/2015 |

* cited by examiner

ARMREST APPARATUSES INCLUDING TRANSLATING DOCKING STATION ARRANGEMENTS FOR MOTOR VEHICLES

TECHNICAL FIELD

The present disclosure relates generally to armrests for motor vehicles, and more particularly to armrest apparatuses for supporting, for example, an arm of a motor vehicle occupant and that includes a translating docking station arrangement for holding a nomadic device.

BACKGROUND

In modern motor vehicles, provisions for stowing and/or using nomadic devices (e.g., portable consumer electronic devices, such as, for example, "smart" phones, tablets, digital music storage/player devices, and other like devices) are being provided with increasingly frequency. Often such provisions are arranged in the vehicle interior, particularly in the area of the dashboard or instrument panel, and can include a mechanical support to hold such portable electronic devices in a "hand-free" manner.

In one example, disclosed in U.S. Pat. No. 8,807,621 issued to Stephan, a docking station for a portable electronic device such as a smart phone is provided as part of a storage compartment on an upper portion of an instrument panel. The docking station includes a device holder for securely retaining a mobile electronic device in an access position where it can be conveniently viewed and/or operated by a front seat vehicle occupant. Unfortunately, such a docking station arrangement for holding and conveniently viewing and/or operating a portable electronic device is limited to only the front seat vehicle occupants for practical use.

Accordingly, it is desirable to provide docking station arrangement for stowing and/or using nomadic devices that is efficiently packaged within the interior of a motor vehicle and that may be conveniently used, for example, by a back seat motor vehicle occupant. Furthermore, other desirable features and characteristics of the present disclosure will become apparent from the subsequent detailed description and the appended claims, taken in conjunction with the accompanying drawings and this background.

BRIEF SUMMARY

Armrest apparatuses for motor vehicles are provided herein. In an exemplary embodiment, an armrest apparatus for a motor vehicle comprises an armrest main base. A translating docking station arrangement for holding a nomadic device is operatively coupled to the armrest main base to move relative to the armrest main base between a retracted position and a deployed position. The translating docking station arrangement in the retracted position substantially covers the armrest main base. The translating docking station arrangement in the deployed position is shifted laterally relative to the retracted position.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the disclosure or the application and uses of the disclosure. Furthermore, there is no intention to be bound by any theory presented in the preceding background or the following detailed description.

Various embodiments contemplated herein relate to armrest apparatuses for motor vehicles. The exemplary embodiments taught herein provide an armrest apparatus for a motor vehicle comprising an armrest main base. Overlying the armrest base is a translating docking station arrangement for holding a nomadic device. The translating docking station arrangement is operatively coupled to the armrest main base to move relative to the armrest main base between a retracted position and a deployed position. In an exemplary embodiment, the translating docking station arrangement in the retracted position substantially covers the armrest main base and has an upper outer surface portion that is position substantially horizontally for supporting an arm of an occupant of the motor vehicle (e.g., front seat motor vehicle occupant). The translating docking station arrangement in the deployed position is shifted laterally relative to the retracted position, at least partially laterally offset from the armrest main base. In an exemplary embodiment, the translating docking station moves in generally a backward facing direction from the retracted position to the deployed position so as to be positioned where, advantageously, it can be conveniently accessed, for example, by a back seat motor vehicle occupant for receiving, securely retaining, and/or viewing a nomadic device.

In an exemplary embodiment, the translating docking station arrangement and the main base together form at least in part an armrest console lid and the armrest apparatus further comprises a console bin with an internal compartment for storage. The armrest console lid is operatively coupled to the console bin to pivot between a closed position to cover the internal compartment and an open position to allow access to the internal compartment. Advantageously, in an exemplary embodiment, the translating docking station arrangement is efficiently integrated into the armrest console lid to thereby minimize package space requirements and cost for providing a docking station arrangement for receiving and stowing a nomadic device.

Figure 1:
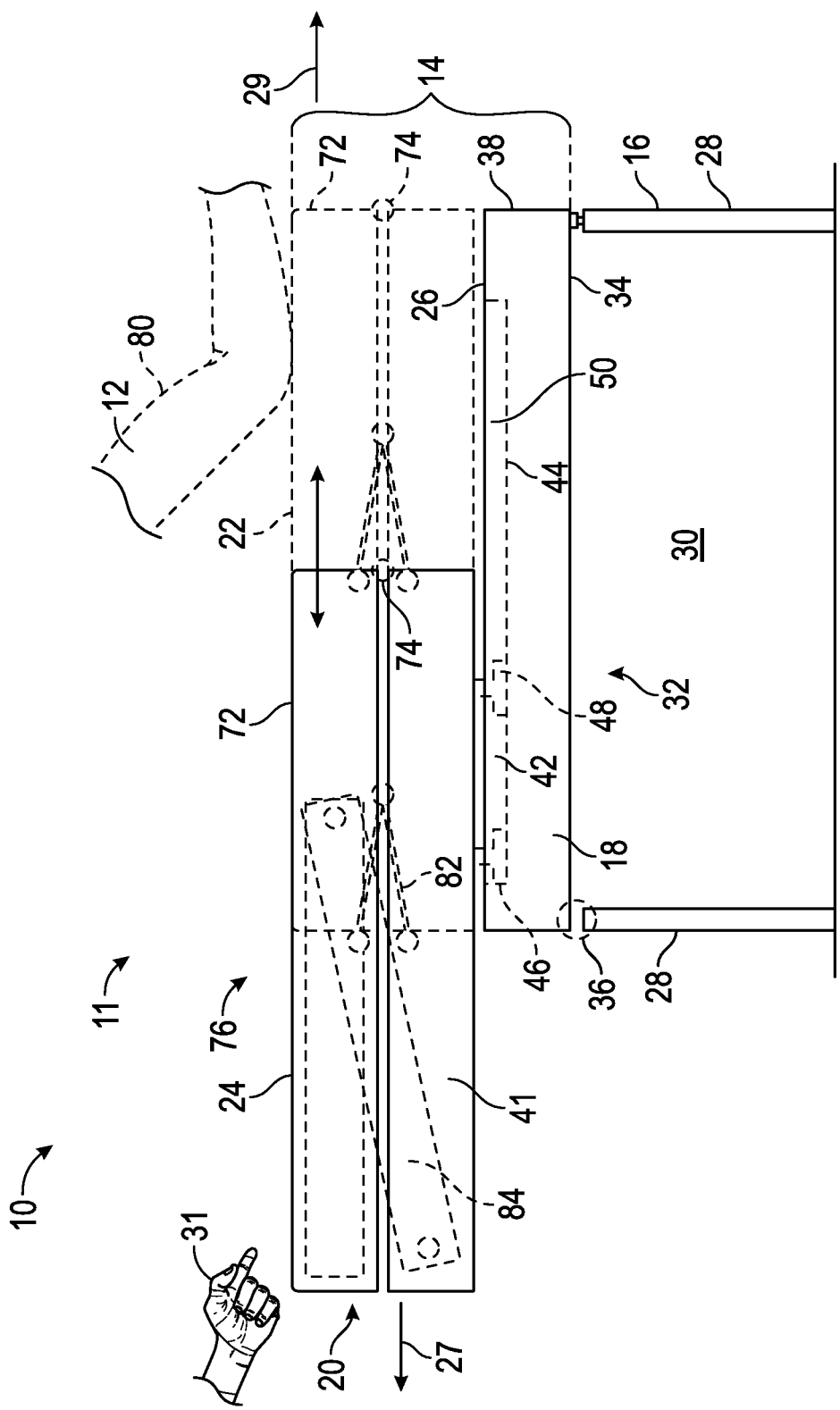
FIG. 1 is a sectional view of an armrest apparatus for a motor vehicle in accordance with an exemplary embodiment.

FIG. 1 is a sectional view of an armrest apparatuses 10 for a motor vehicle in accordance with an exemplary embodiment. The armrest apparatuses 10 may be positioned in, on, or otherwise form at least part of a center console 11 that can be positioned between a driver seat and a front passenger seat in an interior of the motor vehicle. Alternatively, the armrest apparatuses 10 may be positioned in, on, or otherwise form at least part of another interior vehicle trim panel. In an exemplary embodiment and as will be discussed in further detail below, the armrest apparatus 10 is integrated into the center console 11 such that a front seat motor vehicle occupant 12 (e.g., driver and/or front seat passenger) can conveniently use the armrest apparatus 10 as an armrest.

As illustrated, the armrest apparatus 10 comprises an armrest console lid 14 that is operatively coupled to a console bin 16. The armrest console lid 14 comprises an armrest main base 18 and a translating docking station arrangement 20 that is for receiving and stowing a nomadic device 21 (see FIGS. 14A-15B), e.g., a portable consumer electronic device, such as, for example, a "smart" phone, tablets, a digital music storage/player device, a hand-held navigation system, or other hand-held or relatively small electronic device.

The translating docking station arrangement 20 is operatively coupled to the armrest main base 18 to move relative to the armrest main base 18 between a retracted position 22 and a deployed position 24. As will be discussed in further detail below, the translating docking station arrangement 20 in the retracted position 22 substantially covers the armrest main base 18 and in the deployed position 24 is shifted laterally relative to the retracted position 22. In one example, the translating docking station arrangement 20 in the retracted position 22 substantially covers of an upper outer surface portion 26 of the armrest main base 18 and in the deployed position 24, the translating docking station arrangement 20 is at least partially laterally offset from the armrest main base 18 such that at least part of the upper outer surface portion 26 of the armrest main base 18 is exposed. In an exemplary embodiment, the translating docking station arrangement 20 moves in generally a backward facing direction (indicated by arrow 27) while being advanced from the retracted position 22 to the deployed position 24 to advantageously position the translating docking station arrangement 20 proximate a back seat motor vehicle occupant 31 for convenient use by the back seat motor vehicle occupant 31 as a nomadic device docking station. Likewise, the translating docking station arrangement 20 moves in generally a forward facing direction (indicated by arrow 29) while being advanced from the deployed position 24 to the retracted position 22 to advantageously position the translating docking station arrangement 20 proximate the front seat motor vehicle occupant 12 for convenient use by the front seat motor vehicle occupant 12 as an armrest.

Figure 2:
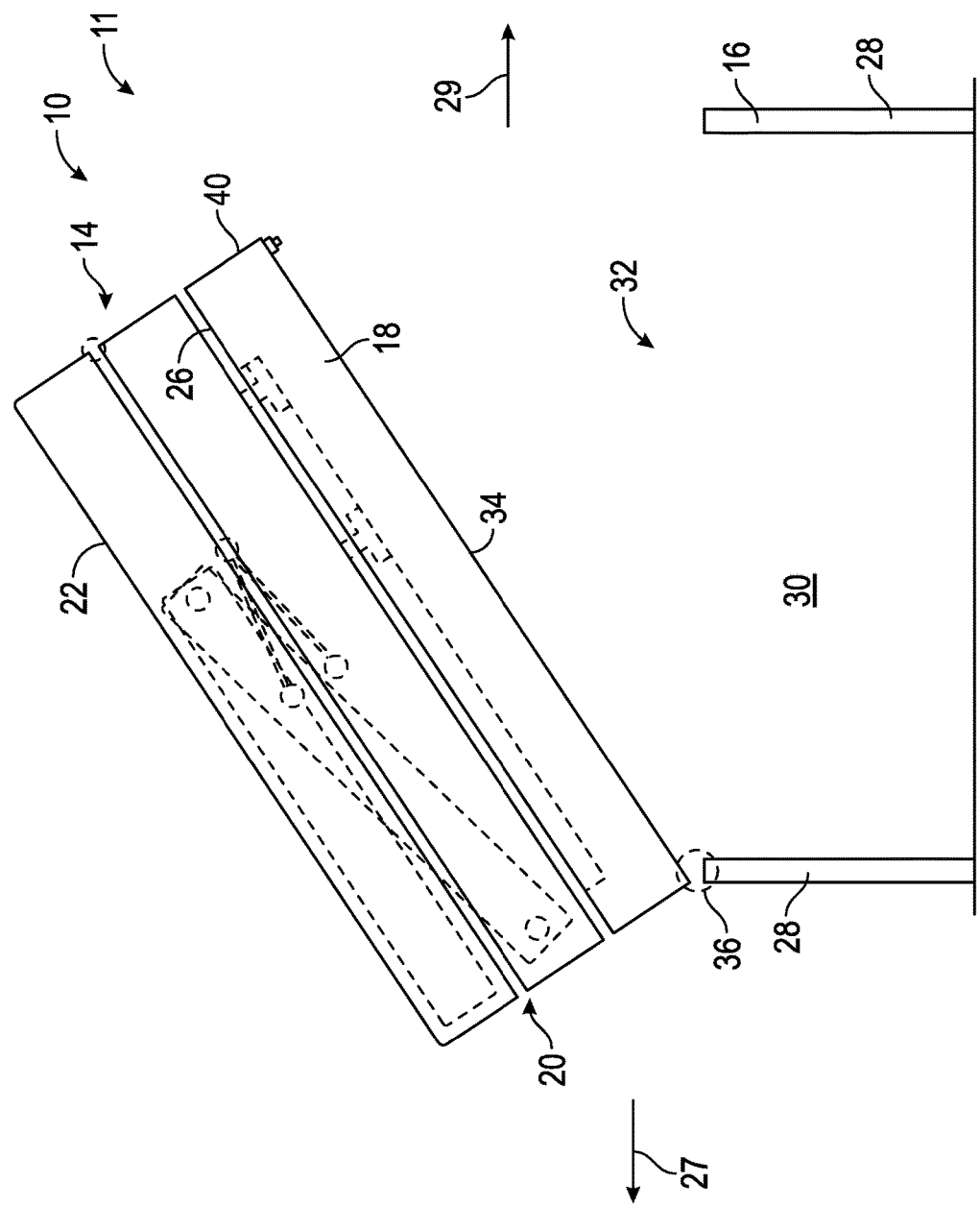
FIG. 2 is a sectional view of an armrest apparatus for a motor vehicle in accordance with another exemplary embodiment.

Referring to FIGS. 1-2, in an exemplary embodiment, the console bin 16 has a bin wall 28 that surrounds an internal compartment 30 for storage and that forms an opening 32 adjacent to a lower outer surface portion 34 of the armrest main base 18. In an exemplary embodiment, the armrest console lid 14 is pivotally coupled to the console bin 16 via a hinge 36 to pivot between a closed position 38 (shown in FIG. 1) and an open position 40 (shown in FIG. 2). In the closed position 38, the armrest console lid 14 covers the opening 32 and in the open position 40, the armrest console lid 14 exposes the opening 32 to allow access to the internal compartment 30. In one example, the armrest console lid 14 opens in generally a forward facing direction 29 to advantageously allow the front seat motor vehicle occupant 12 to conveniently access the internal compartment 30.

Figure 3B:
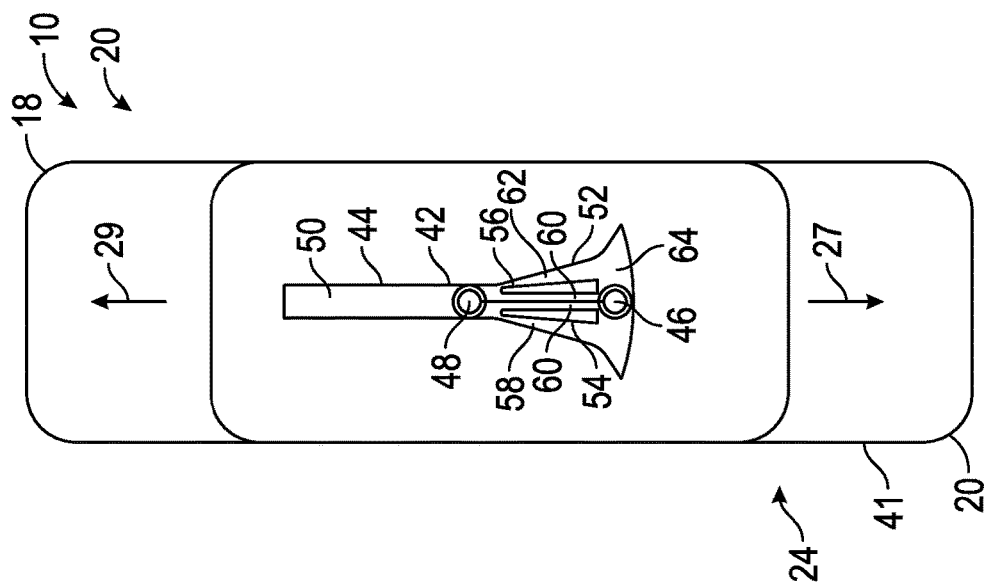
FIGS. 3A-3D are partial top views of an armrest apparatus for a motor vehicle in accordance with an exemplary embodiment.
Figure 3A:
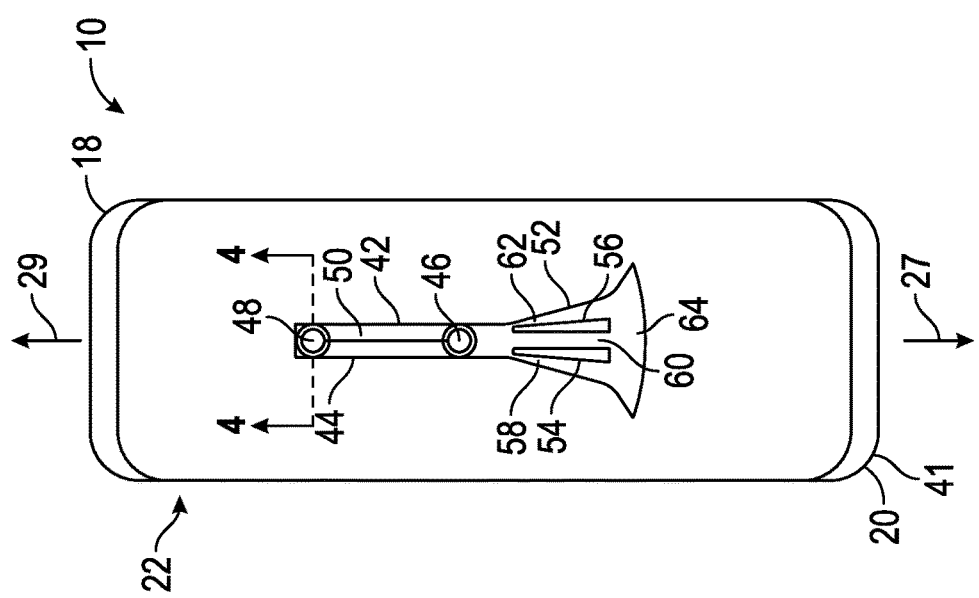
Figure 4A:
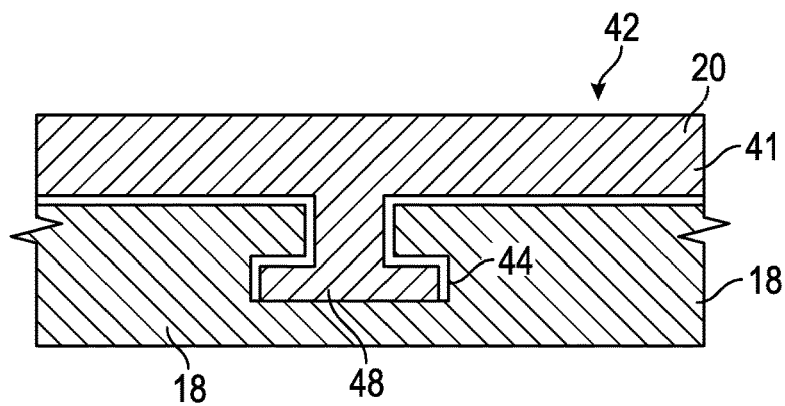
FIGS. 4A-4B are sectional views of the armrest apparatus depicted in FIG. 3A along line 4-4.
Figure 4B:
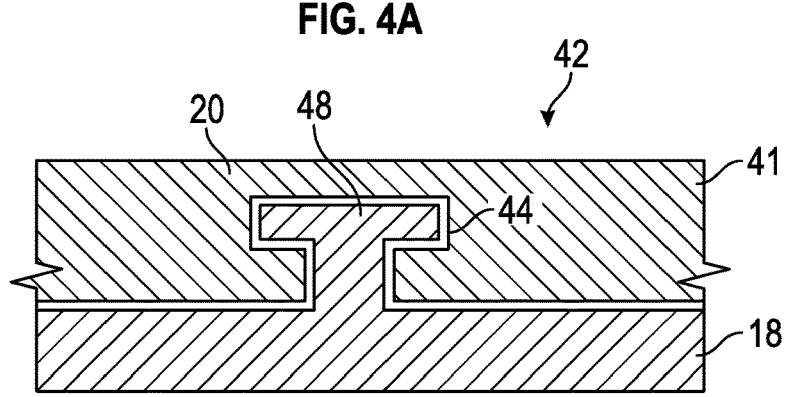
Figure 5:
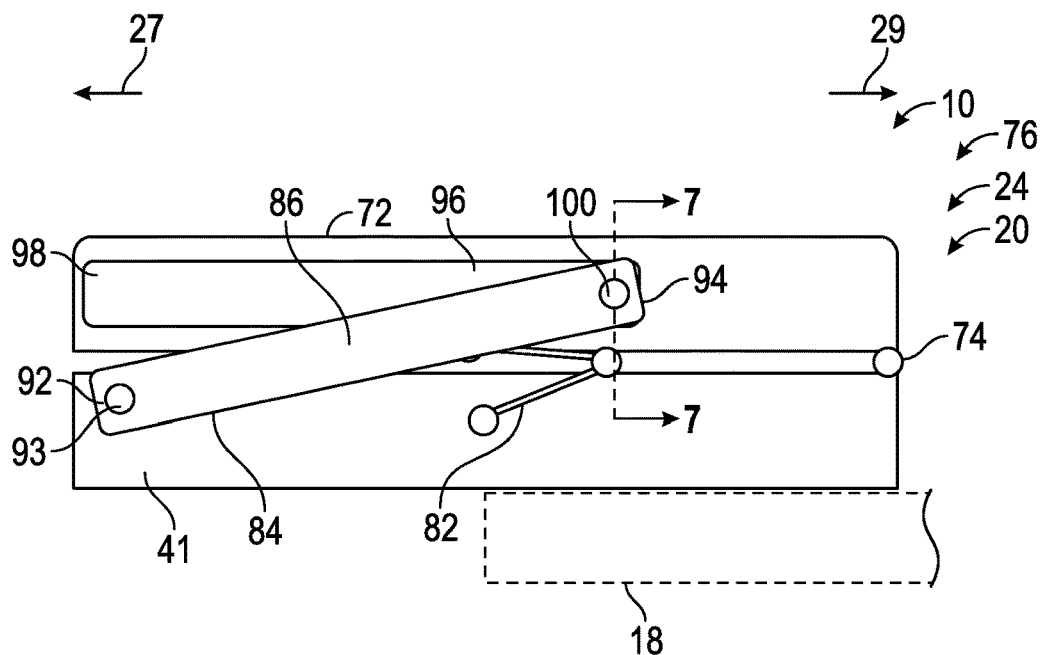
FIG. 5 is a sectional view of an armrest apparatus for a motor vehicle in a collapsed position in accordance with another exemplary embodiment.
Figure 6:
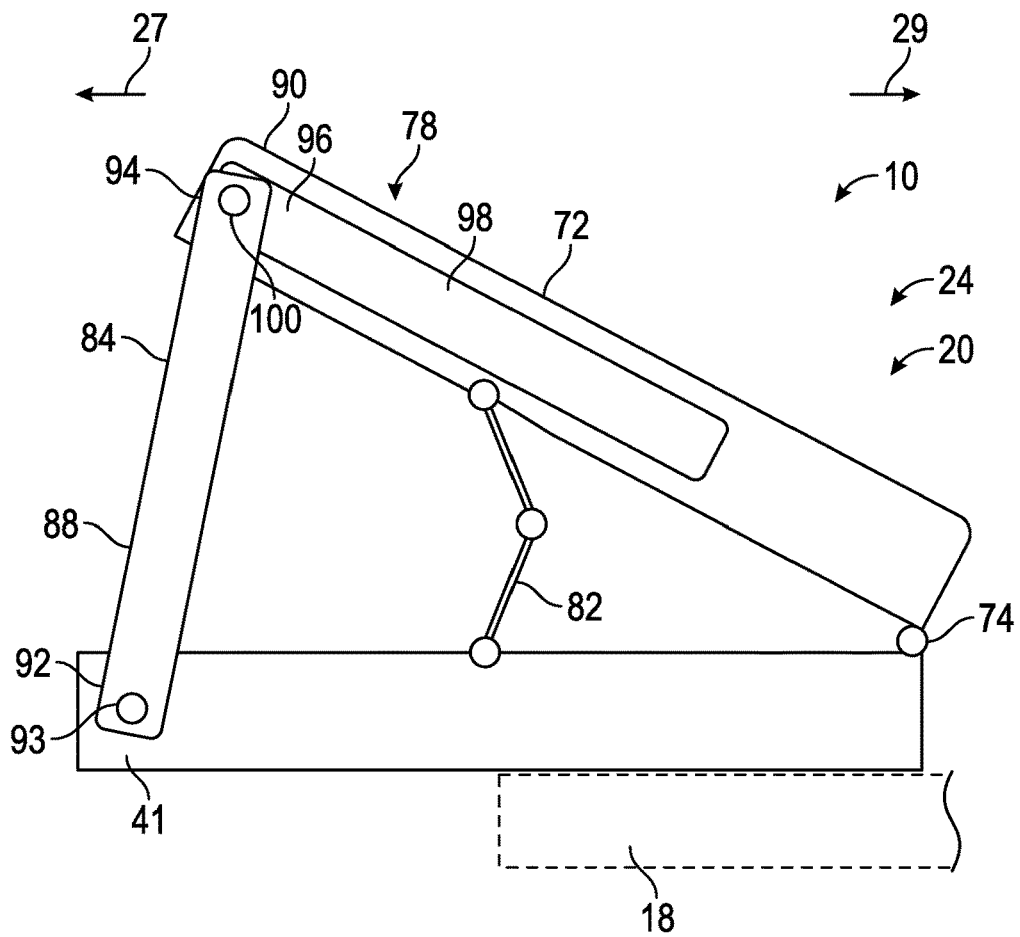
FIG. 6 is a sectional view of an armrest apparatus for a motor vehicle in an expanded position in accordance with another exemplary embodiment.
Figure 7:
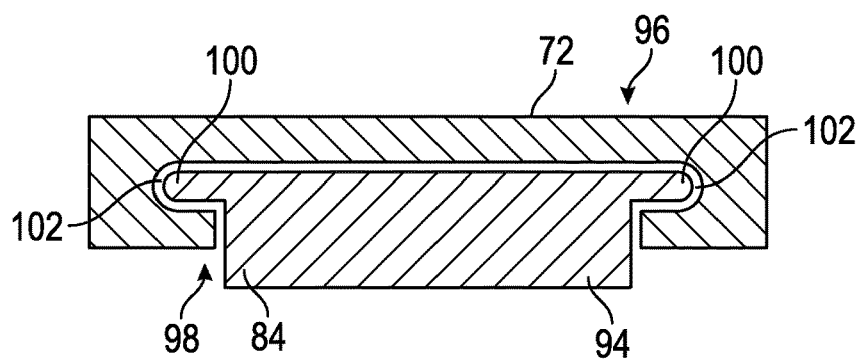
FIG. 7 is a sectional view of the armrest apparatus depicted in FIG. 5 along line 5-5 while in a stowed position.
Figure 8:
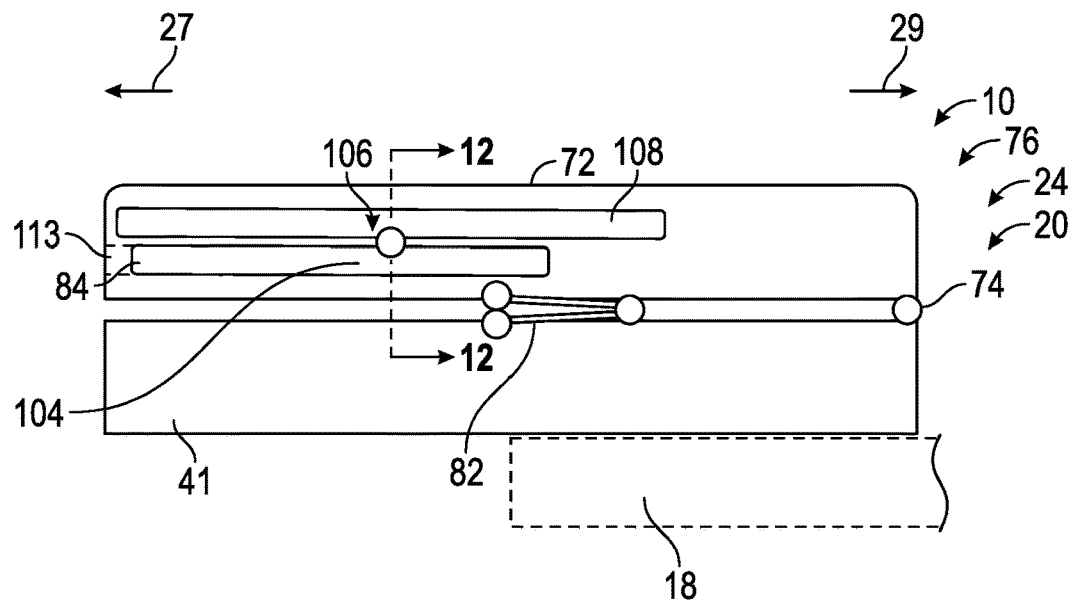
FIGS. 8-11 are sectional views of an armrest apparatus for a motor vehicle in various positions in accordance with another exemplary embodiment.
Figure 9:
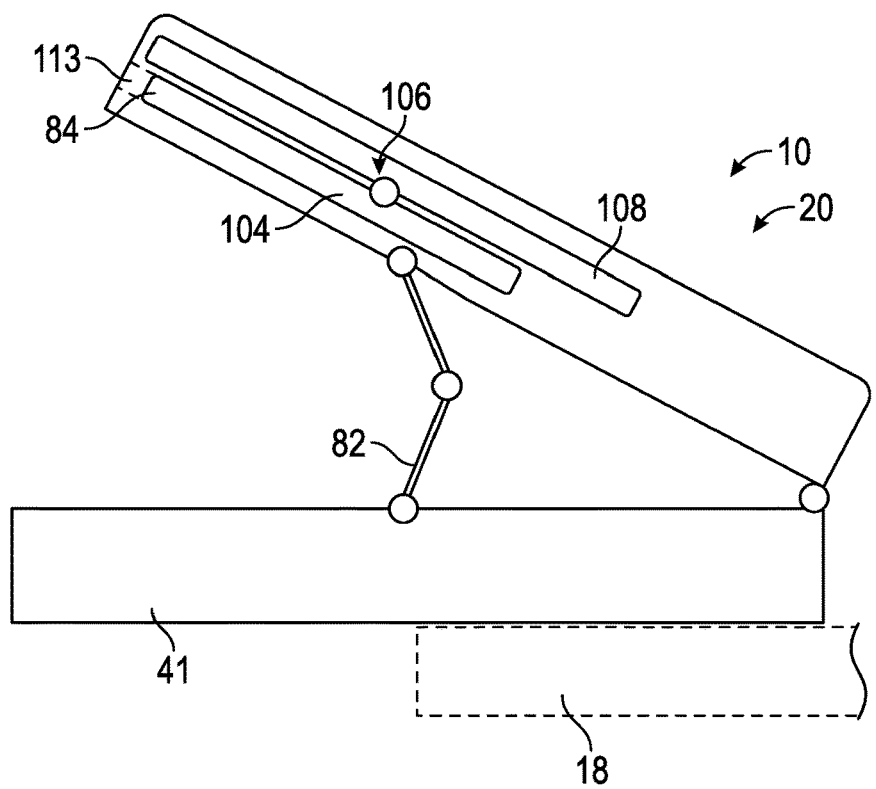
Figure 10:
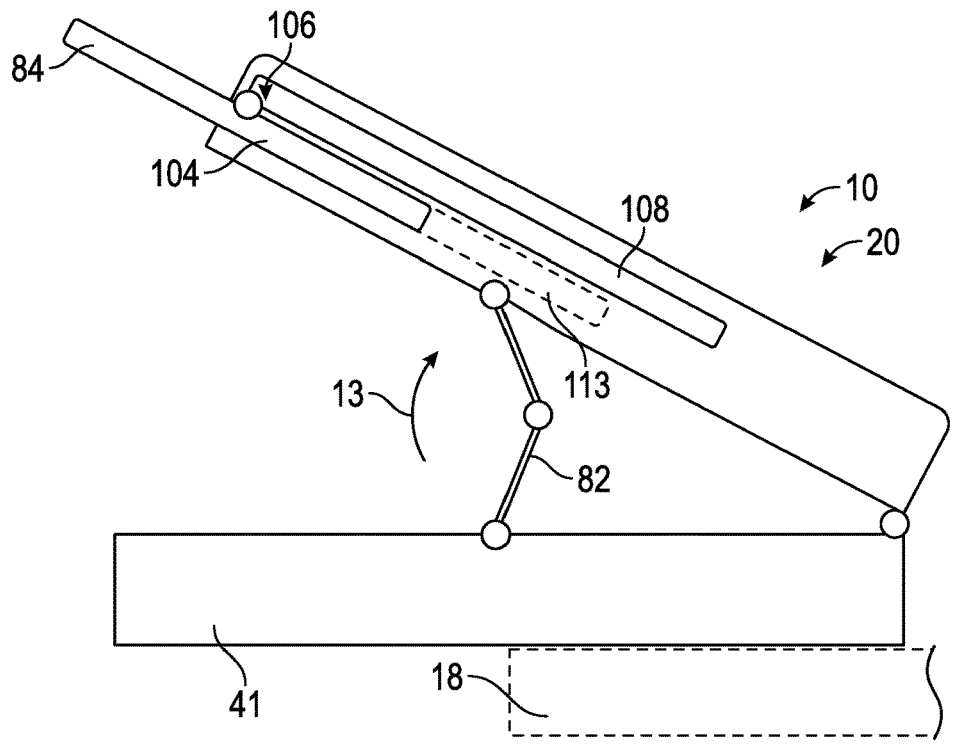
Figure 11:
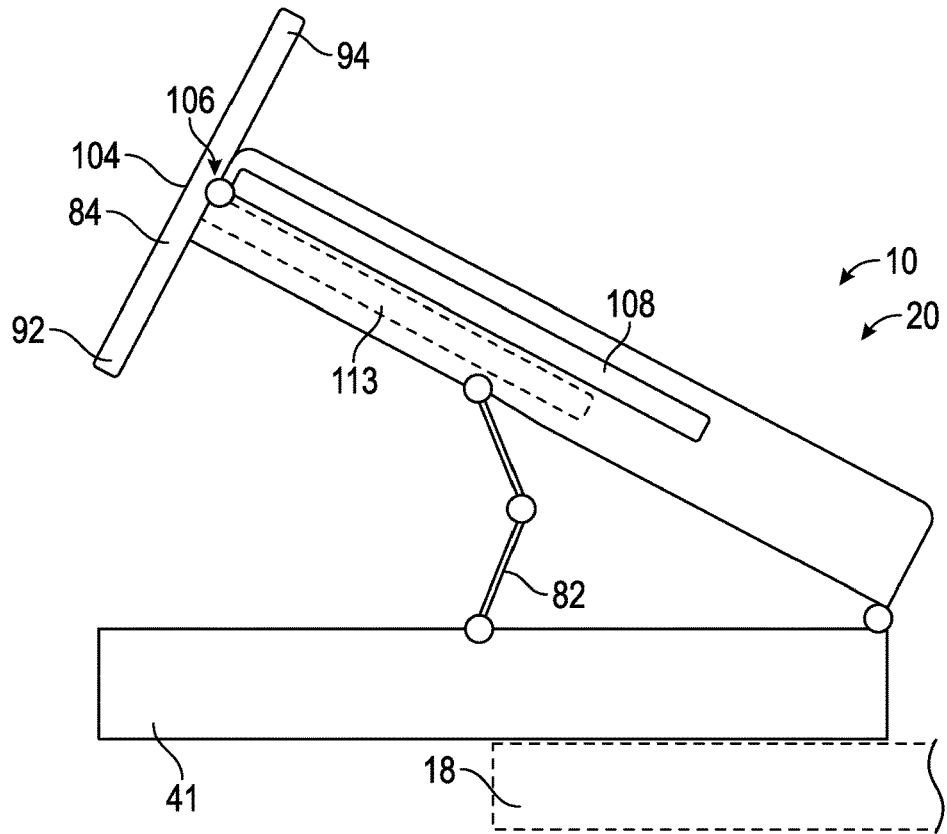

Referring to FIGS. 1 and 3A, in an exemplary embodiment, the translating docking station arrangement 20 comprises a translating base 41 that is operatively coupled to the armrest main base 18 by a tongue and groove arrangement 42 for moving between the retracted and deployed positions 22 and 24. The tongue and groove arrangement 42 includes a track 44 and one or more positive features 46 and 48 that are slidingly coupled to the track 44. In one embodiment and as illustrated in FIG. 4A, the track 44 is formed in the armrest main base 18 and the positive features 46 and 48 extend from the translating base 41 and slidingly engage the track 44. Alternatively and as illustrated in FIG. 4B, the track 44 may be formed in the translating base 41 and the positive features 46 and 48 may extend from the armrest main base 18 and slidingly engage the track 44.

Referring back to FIGS. 1 and 3A, in an exemplary embodiment, the track 44 has a substantially linear open channel portion 50 and a flared open channel portion 52 that extends from an end of the substantially linear open channel portion 50. In one example, the substantially linear open channel portion 50 is generally aligned with the backward and forward facing directions 27 and 29 and the flared open channel portion 52 flares outwardly from the end of the substantially linear open channel portion 50 at angles (e.g., up to about +/−30°) relative to the to the backward facing direction 27.

Figure 3D:
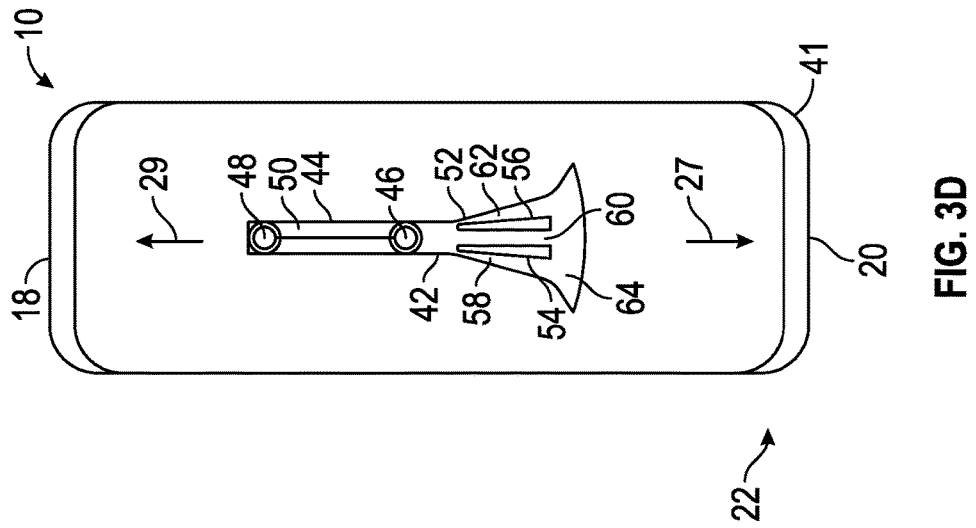
Figure 3C:
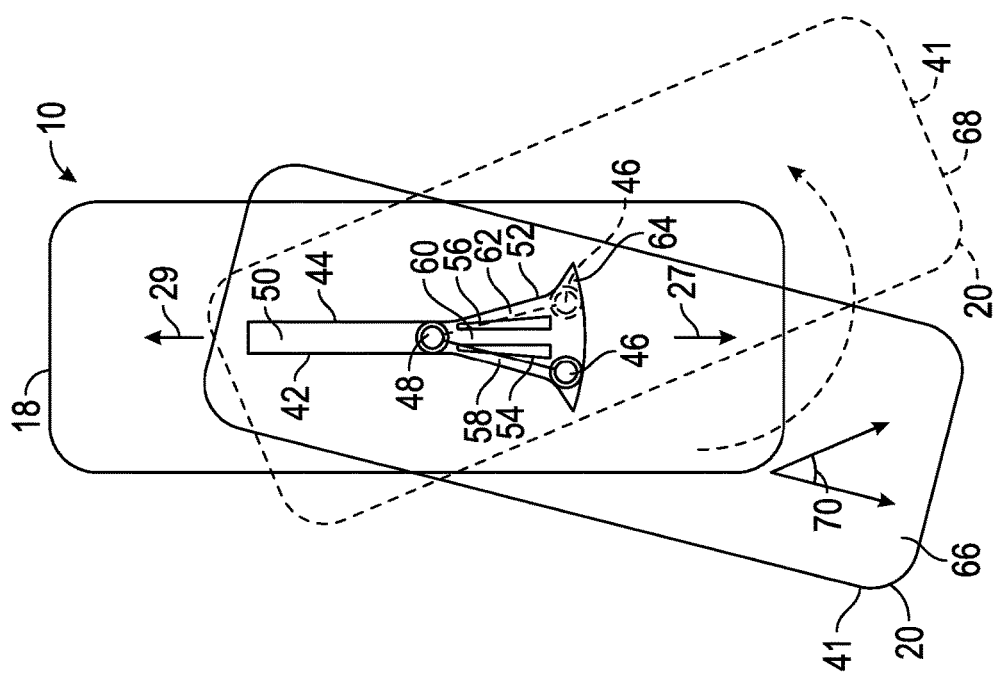

Referring also to FIGS. 3B-3D, in an exemplary embodiment, the armrest main base 18 has a plurality of wedge-shaped projecting features 54 and 56 extending upwardly into the flared open channel portion 52 of the track 44 for slidingly engaging the positive feature 46 during movement through the flared open channel portion 52 between the retracted and deployed positions 22 and 24. In particular, the wedge-shaped projecting features 54 and 56 divide a portion of the flared open channel portion 52 of the track 44 into open channel sections 58, 60, and 62 that extends to an arcuate end open channel section 64.

In an exemplary embodiment, the translating docking station arrangement 20 is manually moved, for example, by the back seat motor vehicle occupant 31 from the retracted position 22 (shown in FIG. 3A) to the deployed position 24 (shown in FIG. 313). Correspondingly during deployment from the retracted position 22 to the deployed position 24, the positive features 46 and 48 slidingly advance along the track 44 where the positive feature 48 advances through the substantially linear open channel portion 50 while the positive feature 46 advances from the substantially linear open channel portion 50 to the flared open channel portion 52, for example, moving through the open channel section 60 to the arcuate end open channel section 64 (shown in FIG. 3B). In an exemplary embodiment, once the positive feature 46 is positioned within the arcuate end open channel section 64, the positive feature 46 and correspondingly, the translating docking station arrangement 20 can be translated away from the backward facing direction 27 to rotate the translating docking station arrangement 20 about the positive feature 48 to a rotated deployed position(s) 66 and/or 68, which is at an angle 70 (e.g., up to about +/−30°) to the backward facing direction 27. Advantageously, in an exemplary embodiment, translating the translating docking station arrangement 20 to the rotated deployed position(s) 66 and/or 68 facilitates positioning the translating docking station arrangement 20 facing directly towards the back seat motor vehicle occupant 31 when the back seat motor vehicle occupant 31 is seated in either the left side back seat or the right side backseat, respectively, of the motor vehicle.

Likewise, in an exemplary embodiment, the translating docking station arrangement 20 may be manually moved, for example, by the back seat motor vehicle occupant 31 from any one the deployed positions 24, 66, or 68 (shown in FIGS. 3B or 3C) back to the retracted position 22 (shown in FIG. 3D). In particular, while the translating docking station arrangement 20 is being returned to the retracted position 22, correspondingly the positive feature 48 slidingly advances through the substantially linear open channel portion 50 generally in the forward facing direction 29 while the positive feature 46 moves from the arcuate end open channel section 64 through any one of the open channel sections 58, 60, or 62 (e.g., depending on the deployed position 24, 66, or 68 of the translating docking station arrangement 20) to the substantially linear open channel portion 50 (shown in FIG. 3D). Advantageously, in an exemplary embodiment, the wedge-shaped projecting features 54 and 56 facilitate directing the positive feature 46 of the translating docking station arrangement 20 through the flared open channel portion 52 during movement of the translating docking station arrangement 20 between the retracted position 22 and the deployed positions 24, 66, and/or 68.

Referring to FIGS. 1 and 5-7. in an exemplary embodiment, the translating docking station arrangement 20 further comprises an armrest upper section 72 that is pivotably coupled to the translating base 41 by a hinge 74 for moving between a collapsed position 76 and an expanded position 78. As illustrated, when the translating docking station arrangement 20 is in the collapsed position 76, the armrest upper section 72 covers the translating base 41 and is substantially horizontally. Additionally, when the translating docking station arrangement 20 is in the retracted position 22 and the collapsed position 76, the armrest upper section 72 is advantageously positioned for conveniently supporting an arm 80 of the front seat motor vehicle occupant 12.

In an exemplary embodiment, the translating docking station arrangement 20 further comprises a spring member 82 operatively coupled to the translating base 41 and the armrest upper section 72 for moving the armrest upper section 72 from the collapsed position 76 to the expanded position 78. In one example, the spring member 82 is part of a conventional push-push mechanism that is actuated, for example, by the back seat motor vehicle occupant 31 by pushing down on the armrest upper section 72 to release the armrest upper section 72 from a locked condition, thereby allowing the spring member 82 to move the armrest upper section 72 up to the expanded position 78. As illustrated, in the expanded position 78, the armrest upper section 72 is positioned at an incline to the translating base 41. Likewise, the armrest upper section 72 may be returned to the collapsed position 76 by the back seat motor vehicle occupant 31 pushing down on the armrest upper section 72 against the force exerted by the spring member 82 to move the armrest upper section 72 down to the collapsed position 76, for example, until the push-push mechanism locks the armrest upper section 72 in the collapsed position 76. In one embodiment, the spring member 82 is limited to moving the armrest upper section 72 from the collapsed position 76 to the expanded position 78 only when the armrest upper section 72 is not in or otherwise is moved out of the retracted position 22 so as to advantageous prevent the armrest upper section 72 opening, for example, by the front seat motor vehicle occupant 12 while in use as an armrest.

In an exemplary embodiment, the translating docking station arrangement 20 further comprises a docking support panel 84 operatively coupled to the armrest upper section 72 and also to the translating base 41 for moving between a stowed position 86 and a holding position 88 in response to the armrest upper section 72 correspondingly moving between the collapsed position 76 and the expanded position 78. The docking support panel 84 in the stowed position 86 is substantially covered by the armrest upper section 72. In the holding position 88, the docking support panel 84 extends substantially transverse from an end portion 90 of the armrest upper section 72 for receiving and holding the nomadic device 21 (shown in FIGS. 14A-15B). In an exemplary embodiment, advantageously, the docking support panel 84 in the holding position 88 faces generally in the backward facing direction 27 for convenient use by the back seat motor vehicle occupant 31 for receiving, holding, and viewing of the nomadic device 21 (shown in FIGS. 14A-15B).

In an exemplary embodiment, the docking support panel 84 has a lower end portion 92 that is pivotably coupled to the translating base 41 about pivot joint 93 and an upper end portion 94 that is slidingly coupled to the armrest upper section 72 for moving between the stowed position 86 and the holding position 88. As illustrated, the upper end portion 94 of the docking support panel 84 and the armrest upper section 72 are slidingly coupled via a tongue and groove arrangement 96. In particular, the tongue and groove arrangement 96 includes an open channel 98 formed in the armrest upper section 72 and lateral projecting features 100 extending laterally from opposing sides of the upper end portion 94 of the docking support panel 84. The lateral projecting features 100 of the docking support panel 84 slidingly engage undercut portions 102 of the open channel 98 such that when the armrest upper section 72 moves to the expanded position 78, the docking support panel 84 in response automatically moves to the holding position 88, and likewise, when the armrest upper section 72 moves to the collapsed position 76, the docking support panel 84 in response automatically moves to the stowed position 86.

Figure 12:
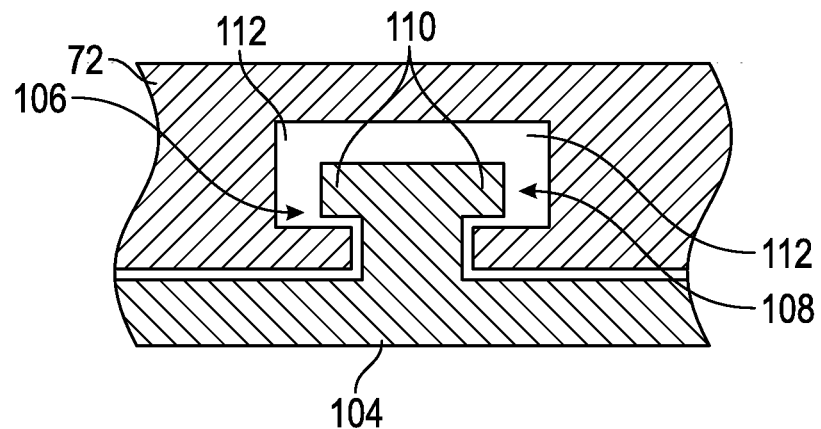
FIG. 12 is a sectional view of the armrest apparatus depicted in FIG. 8 along line 12-12.

Referring to FIGS. 8-11, in another embodiment, the docking support panel 84 is operatively coupled to the armrest upper section 72, without being operatively coupled to the translating base 41, for moving between the stowed and holding positions 86 and 88. As illustrated, the docking support panel 84 has an intermediate portion 104 that is between the lower and upper end portions 92 and 94 and that is operatively coupled to the armrest upper section 72. In an exemplary embodiment and referring also to FIG. 12, the intermediate portion 104 of the docking support panel 84 is slidingly coupled to the armrest upper section 72 via a tongue and groove arrangement 106 for moving between the stowed position 86 and the holding position 88. In particular, the tongue and groove arrangement 106 includes an open channel 108 formed in the armrest upper section 72 and lateral projecting features 110 projecting from the intermediate portion 104 of the docking support panel 84. The lateral projecting features 110 of the docking support panel 84 slidingly engage undercut portions 112 of the open channel 108 so that the docking support panel 84 can be manually moved, for example, by the back seat motor vehicle occupant 31 to the holding position 88, e.g., when the armrest upper section 72 is in the expanded position 78, and as sequentially illustrated in FIGS. 9-11, back to the stowed position 86, e.g., prior to returning the armrest upper section 72 to the collapsed positioned 76.

Figure 13:
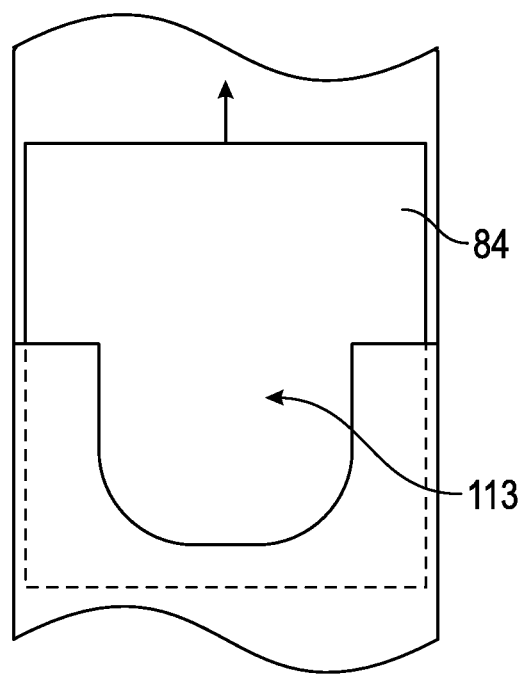
FIG. 13 is a bottom view of the armrest apparatus depicted in FIG. 10 along arrow 13.

Referring also to FIG. 13, in an exemplary embodiment, the docking support panel 84 is disposed in a U-shaped open channel 113 for packaging the docking support panel 84 in the armrest upper section 72 while in the stowed position 86. Advantageously, in an exemplary embodiment, the U-shaped open channel 113 allows the docking support panel 84 to be smoothly advanced from the stowed position 86, inside the armrest upper section 72, to the holding position 88 where the docking support panel 84 is disposed outside of the armrest upper section 72, and vice versa for returning the docking support panel 84 to the stowed position 86. In one embodiment, the docking support panel 84 is locked and unlocked from the holding position 88 via a molded-in detent feature between the docking support panel 84 and the U-shaped open channel 113 that would engage at the end of the translation of the docking support panel 84 back into the stowed position 86 in the U-shaped open channel 113.

Figure 14B:
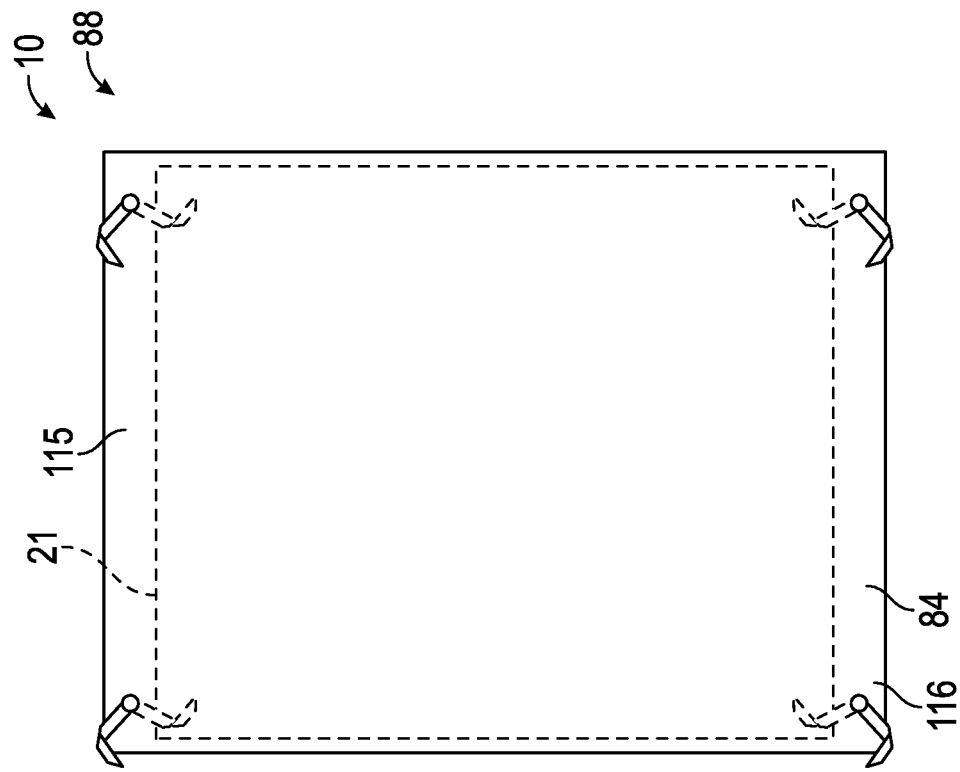
FIG. 14B is a front view of the portion the armrest apparatus depicted in FIG. 14A.
Figure 14A:
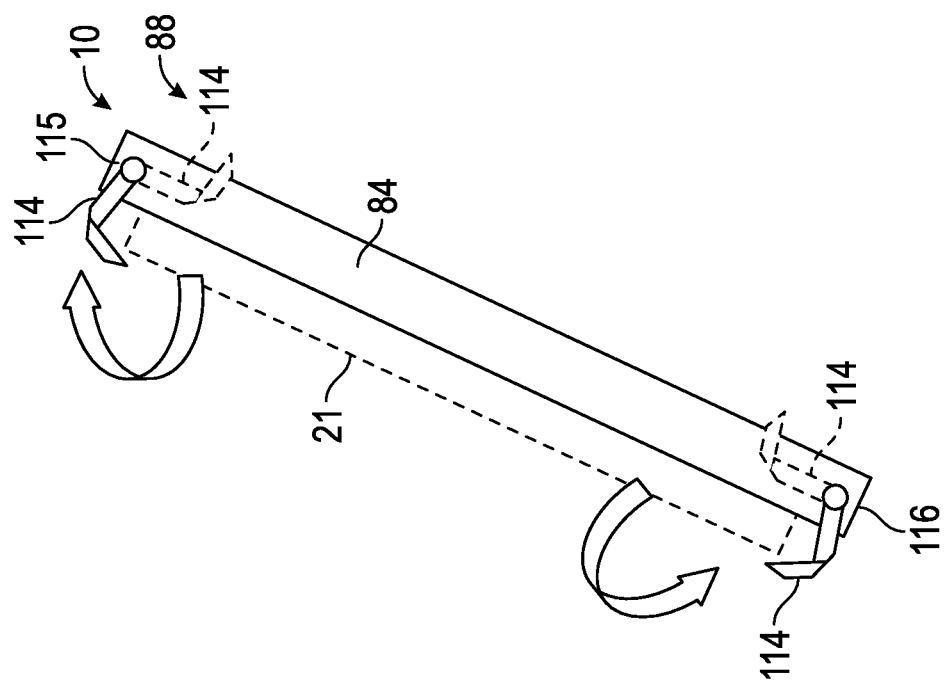
FIG. 14A is a sectional view of a portion an armrest apparatus for a motor vehicle in accordance with an exemplary embodiment.

Referring to FIGS. 14A-14B, in an exemplary embodiment, the armrest apparatus 10 comprises a plurality of retaining members 114 operatively coupled to the docking support panel 84 for retaining the nomadic device 21 to the docking support panel 84 when the docking support panel 84 is in the holding position 88. As illustrated, the docking support panel 84 has an upper section 115 that includes retaining members 114 (e.g., downward facing open hook section) pivotally coupled to the docking support panel 84 and a lower section 116 that includes a retaining members 114 (e.g., upward facing open hook section) pivotally coupled to the docking support panel 84. As such, advantageously, the retaining members 114 can be rotated or otherwise moved (e.g., manually, spring loaded, and/or otherwise) relative to each other to receive, stow, and release the nomadic device 21.

Figure 15A:
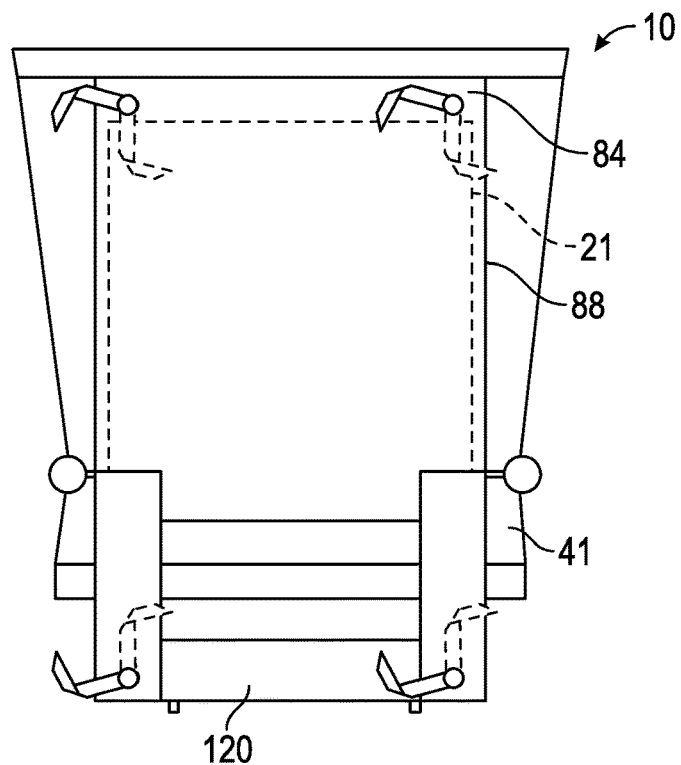
FIG. 15A is a front view of a portion of an armrest apparatus for a motor vehicle in accordance with another exemplary embodiment.
Figure 15B:
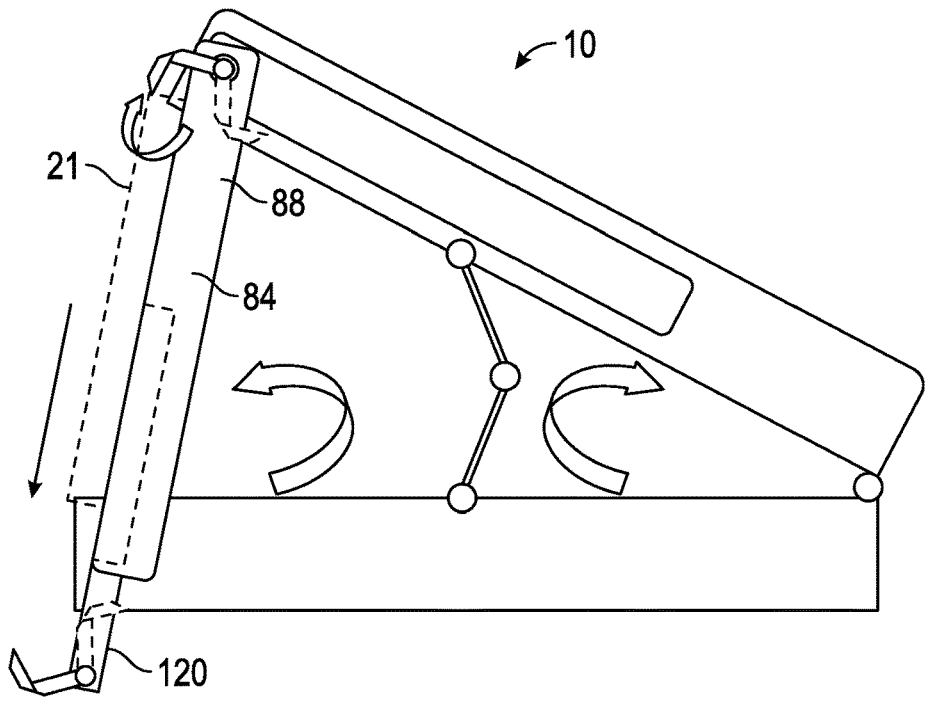
FIG. 15B is a sectional view of the armrest apparatus depicted in FIG. 15A.

Referring to FIGS. 15A-159, in an exemplary embodiment, the armrest apparatus 10 comprises an extension panel 120 operatively coupled to the docking support panel 84 for movably extending from the docking support panel 84 to provide additional space for supporting the nomadic device 21 when the docking support panel 84 is in the holding position 88. In an exemplary embodiment, the docking support panel 84 without extending the extension panel 120 can accommodate a nomadic device 21 with a height of up to about 160 mm and with the extension panel 120 extended, can accommodate a nomadic device with a height up to about 140 mm. As such, advantageously, the docking support panel 84 with the extension panel 120 can be used to accommodate different size nomadic devices.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An armrest apparatus for a motor vehicle, the armrest apparatus comprising:
   an armrest main base; and
   a translating docking station arrangement for holding a nomadic device and operatively coupled to the armrest main base to move relative to the armrest main base between a retracted position and a deployed position, wherein the translating docking station arrangement in the retracted position substantially covers the armrest main base and in the deployed position is shifted laterally relative to the retracted position, wherein the armrest main base and the translating docking station arrangement together form part of an armrest console lid, wherein the armrest main base has a track formed therein and the translating docking station arrangement has one or more positive features slidingly coupled to the track for moving between the retracted position and the deployed position, and wherein the armrest apparatus further comprises:
   a console bin having a bin wall that surrounds an internal compartment configured for storage and that defines an opening for accessing the internal compartment, wherein the armrest console lid is operatively coupled to the console bin to pivot between a closed position to cover the opening and an open position to expose the opening for allowing access to the internal compartment.

2. The armrest apparatus of claim 1, wherein the armrest main base has a lower outer surface portion and an upper outer surface portion on a side opposite the lower outer surface portion, and wherein the translating docking station arrangement in the retracted position substantially covers the upper outer surface portion of the armrest main base and in the deployed position is shifted laterally relative to the retracted position such that at least part of the upper outer surface portion of the armrest main base is exposed.

3. The armrest apparatus of claim 1, wherein the translating docking station arrangement is configured to move in generally a backward facing direction from the retracted position to the deployed position.

4. The armrest apparatus of claim 3, wherein the armrest console lid is operatively coupled to the console bin to open in generally a forward facing direction that is substantially opposite the backward facing direction.

5. The armrest apparatus of claim 1, wherein the translating docking station arrangement is configured to move in a first direction during deployment from the retracted position to the deployed position, and wherein the translating docking station arrangement is further configured to translate away from the first direction to a rotated deployed position that is at an angle to the first direction.

6. The armrest apparatus of claim 1, wherein the track has a substantially linear open channel portion and a flared open channel portion that extends from the substantially linear open channel portion, and wherein the one or more positive features of translating docking station arrangement are slidingly coupled to the track to move along the substantially linear open channel portion and the flared open channel portion during movement between the retracted position and the deployed position.

7. The armrest apparatus of claim 6, wherein the armrest main base has at least one wedge-shaped projecting feature extending in the flared open channel portion of the track configured to facilitate directing one of the one or more positive features of the translating docking station arrangement through the flared open channel portion.

8. An armrest apparatus for a motor vehicle, the armrest apparatus comprising:
an armrest main base; and
a translating docking station arrangement for holding a nomadic device and operatively coupled to the armrest main base to move relative to the armrest main base between a retracted position and a deployed position, wherein the translating docking station arrangement in the retracted position substantially covers the armrest main base and in the deployed position is shifted laterally relative to the retracted position, wherein the armrest main base and the translating docking station arrangement together form part of an armrest console lid, and wherein the armrest apparatus further comprises:
a console bin having a bin wall that surrounds an internal compartment configured for storage and that defines an opening for accessing the internal compartment, wherein the armrest console lid is operatively coupled to the console bin to pivot between a closed position to cover the opening and an open position to expose the opening for allowing access to the internal compartment, and wherein the translating docking station arrangement comprises:
a translating base operatively coupled to the armrest main base for relative movement to the armrest main base between the retracted position and the deployed position;
an armrest upper section configured for supporting an arm of a vehicle occupant and pivotally coupled to the translating base for moving between a collapsed position and an expanded position, wherein the armrest upper section in the collapsed position substantially covers the translating base and has an upper outer surface portion that is positioned substantially horizontally for supporting the arm of the vehicle occupant, and wherein the armrest upper section in the expanded position is positioned at an incline to the translating base; and
a docking support panel operatively coupled to the armrest upper section for moving between a stowed position and a holding position, wherein the docking support panel in the stowed position is substantially covered by the armrest upper section, and wherein the docking support panel in the holding position extends substantially transverse from the armrest upper section for receiving and holding the nomadic device.

9. The armrest apparatus of claim 8, wherein the docking support panel has a lower end portion and an upper end portion that is opposite the lower end portion, and wherein the lower end portion and the upper end portion of the docking support panel are operatively coupled to the translating base and the armrest upper section, respectively, for moving between the stowed position and the holding position.

10. The armrest apparatus of claim 8, wherein the docking support panel has a lower end portion, an upper end portion, and an intermediate portion that is between the lower and upper end portions, and wherein the intermediate portion of the docking support panel is operatively coupled to the armrest upper section for moving between the stowed position and the holding position.

11. The armrest apparatus of claim 8, wherein the docking support panel in the holding position faces generally in a backward facing direction.

12. The armrest apparatus of claim 8, further comprising a plurality of retaining members operatively coupled to the docking support panel for retaining the nomadic device to the docking support panel when the docking support panel is in the holding position.

13. An armrest apparatus for a motor vehicle, the armrest apparatus comprising:
an armrest main base; and
a translating docking station arrangement for holding a nomadic device and operatively coupled to the armrest main base to move relative to the armrest main base between a retracted position and a deployed position, wherein the translating docking station arrangement in the retracted position substantially covers the armrest main base and in the deployed position is shifted laterally relative to the retracted position, and wherein the translating docking station arrangement comprises:
a translating base operatively coupled to the armrest main base for relative movement to the armrest main base between the retracted position and the deployed position;
an armrest upper section configured for supporting an arm of a vehicle occupant and pivotally coupled to the translating base for moving between a collapsed position and an expanded position, wherein the armrest upper section in the collapsed position substantially covers the translating base and has an upper outer surface portion that is positioned substantially horizontally for supporting the arm of the vehicle occupant, and wherein the armrest upper section in the expanded position is positioned at an incline to the translating base; and
a docking support panel operatively coupled to the armrest upper section for moving between a stowed position and a holding position, wherein the docking support panel in the stowed position is substantially covered by the armrest upper section, and wherein the docking support panel in the holding position extends substantially transverse from the armrest upper section for receiving and holding the nomadic device, and wherein the armrest apparatus further comprises an extension panel operatively coupled to the docking support panel for movably extending from the docking support panel to provide additional space for supporting the nomadic device when the docking support panel is in the holding position.

* * * * *